(12) United States Patent
Yoshida et al.

(10) Patent No.: US 6,178,690 B1
(45) Date of Patent: Jan. 30, 2001

(54) PLANT CULTIVATION MAT AND METHOD FOR LAYING THE SAME

(75) Inventors: Minoru Yoshida; Kazuo Kumura, both of Yamato; Takaharu Yoshioka, Sagamihara; Shinji Uchida, Toride, all of (JP)

(73) Assignee: Kyodo Ky-Tec Corp., Tokyo (JP)

( * ) Notice: Under 35 U.S.C. 154(b), the term of this patent shall be extended for 0 days.

(21) Appl. No.: 09/307,732

(22) Filed: May 10, 1999

(30) Foreign Application Priority Data

May 12, 1998 (JP) .................................................. 10-129302

(51) Int. Cl.$^7$ ...................................................... A01G 9/02
(52) U.S. Cl. .............................................. 47/65.9; 47/66.1
(58) Field of Search ................................. 47/59, 60, 62 R, 47/65.9, 66.1, 86, 85, 66.5, 61, 63, 64

(56) References Cited

U.S. PATENT DOCUMENTS

| | | | |
|---|---|---|---|
| 4,058,930 | * 11/1977 | Miles | ................................. 47/65.9 X |
| 4,658,542 | * 4/1987 | Holmberg . | |
| 5,010,687 | * 4/1991 | Hougard | ............................. 47/65.5 X |

FOREIGN PATENT DOCUMENTS

| | | |
|---|---|---|
| 2261651 | * 6/1974 | (DE) . |
| 2085702 | * 5/1982 | (GB) . |
| 2201323 | * 9/1988 | (GB) . |
| 10-295193 | * 11/1998 | (JP) . |
| 11-75568 | * 3/1999 | (JP) . |

* cited by examiner

Primary Examiner—Michael J. Carone
Assistant Examiner—Jeffrey L. Gellner
(74) Attorney, Agent, or Firm—Armstrong, Westerman, Hattori, McLeland & Naughton

(57) ABSTRACT

This invention is to provide a plant cultivation mat which can be applied to those existing buildings, and which does not require large amount of time, labor and cost for its laying and removing works, and a method for laying such plant cultivation mat, as well. According to the invention, there is provided a plant cultivation mat, comprising one or a plurality of cells with water-passage ports being perforated in the vicinity of the bottom part thereof, said one or a plurality of cells constituting a mat frame disposed in a depressed form to permit the top part thereof to open, and an inwardly recessed part being formed at the lower required part of the side wall of said cell. When this plant cultivation mat is to be laid, arrangement is made as to forming a space having a required route at the inwardly recessed part of the cell so as to form a space having a required routein the inwardly recessed part of the cell. Before the plant cultivation mat is to be laid on the mat laying surface, a water holding layer is provided beforehand. It is further preferable that, at the time of filling the laying surface with this plant cultivation mat, the space having a required route is formed, and simultaneously water supply pipe is disposed in an arbitrary route in said space.

9 Claims, 26 Drawing Sheets

PLANT CULTIVATION MAT AND METHOD FOR LAYING THE SAME

BACKGROUND OF THE INVENTION a) Field of the Invention

This invention relates to a plant cultivation mat (or grass growing mat) to be laid on the roof top, veranda, terrace, etc. of buildings (in particular, an artificial ground) for growing various plants such as, especially, ground-covering plants like lawn, etc., grasses, flowers, vegetables, and so forth, and to a method for laying such plant cultivation mat.

b) Description of Prior Arts

It has been the conventional practice that, when cultivating or growing plants at a location having flat laying surface such as the roof top, veranda, terrace, etc. of buildings, a water-prevention layer and a root-protecting layer is formed, or a sheet is further laid thereover, and then soil is spread over the sheet to cultivate ground-covering plants such as lawn, grasses and shrubs, vegitables, and so forth (vide: for example, laid-open gazette of Japanese Patent Application No. 4-99411).

With the abovementioned method of spreading soil, however, there arises necessity for providing outfits such as water-prevention layer, etc., which give rise to various problems such that the equipment can hardly be adopted in those existing buildings, while cost to be borne would increase when it is adopted in new buildings.

Furthermore, a large-scaled working becomes necessary for utilization of the abovementioned plant cultivating facility, which requires enormous amount of time and labor.

On the other hand, the life of the water prevention layer is, in general, said to last from ten to fifteen years, which would require removal for replacement of the layer at every time its service life is ended. Besides its service life, when there occur unexpected damages to the water-prevention layer and the laying surface of the plant cultivation mat during the plant cultivation work, it becomes also necessary to remove the plants under cultivation and the soils for cultivation with a view to repairing such water prevention layer from leaking. Again, enormous amount of time and labor are needed for this removing work.

SUMMARY OF THE INVENTION

The present invention has been made in view of the afore-described points of problem, and aims at providing the plant cultivation mat which can be adopted in those existing buildings, and does not require a great deal of time, labor, and cost for its laying and removing and the method for laying such plant cultivation mat, as well.

A further object of the present invention is to provide the plant cultivation mat and the method for its laying, which is easier for controlling the soil and the water.

According to the present invention, in one aspect thereof, there is provided a plant cultivation mat, which comprises one or a plurality of cells with water-passage ports being perforated in the vicinity of the bottom part thereof, said one or a plurality of cells constituting a mat frame disposed in a depressed form to permit the top part thereof to open, and an inwardly recessed part being formed at the lower part of the requisite side wall of the cell.

According to the present invention, in another aspect thereof, there is provided a method for laying a plant cultivation mat, which comprises laying said plant cultivation mat on the laying surface in a manner to define a space having a required route within an inwardly recessed part of the cell.

According to the present invention, in still another aspect thereof, there is provided a method for laying the plant cultivation mat, which comprises: providing, in advance of laying the plant cultivation mat, a water-holding layer on the mat laying surface.

According to further object of the present invention, there is provided a method for laying plant cultivation mat, which comprises, at the time of laying the plant cultivation mat on the mat laying surface, defining a space having a required route, and simultaneously disposing water-supply pipe in any arbitrary route in this space.

The foregoing objects, other objects as well as the specific construction and function of the present invention will become more apparent and understandable from the following detailed explanations thereof, when read in conjunction with the accompanying drawing.

BRIEF EXPLANATION OF THE ACCOMPANYING DRAWING

DETAILED DESCRIPTION OF THE INVENTION

Figure 1:
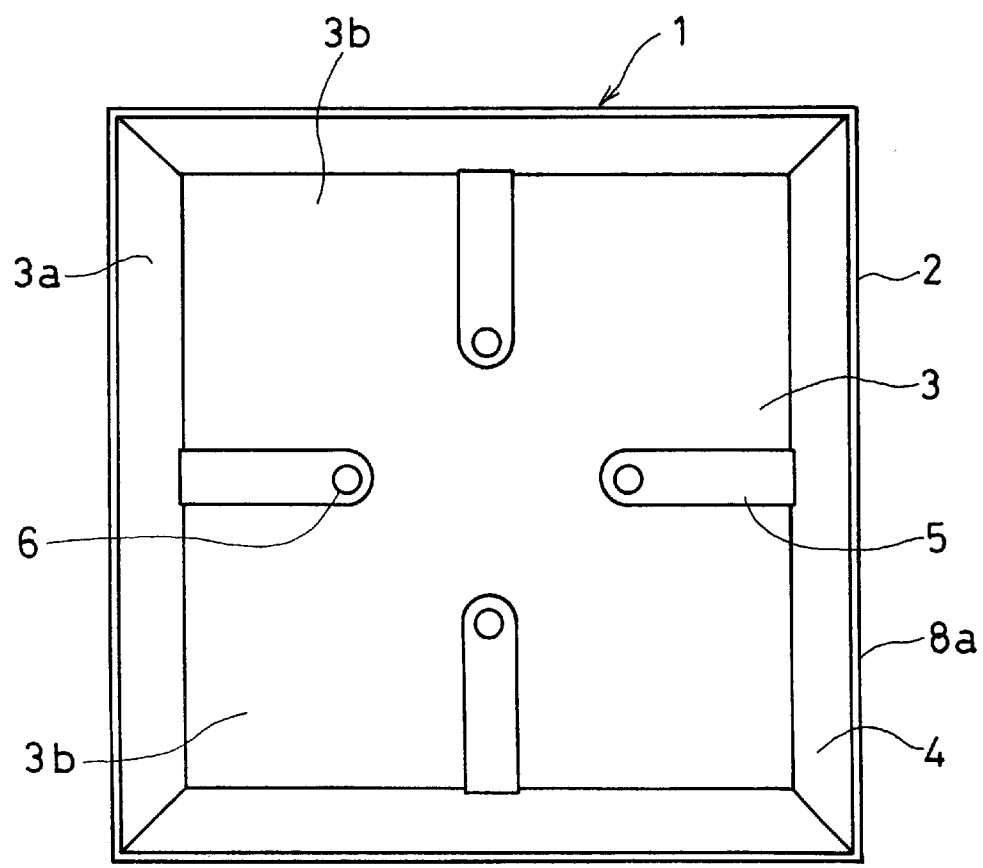
FIG. 1 is a plan view showing the first embodiment of the plant cultivation mat according to the present invention.

As described at the outset, the advantage of the present invention is that the laying and removing works of the plant cultivation mat can be done in an extremely easy manner and in a short period of time, and yet at the minimum cost, because one or more dismountable and light weight plant cultivation mats are laid on the mat laying surface.

In addition, by simply laying, on the mat laying surface, a plurality of plant cultivation mats, each having an inward recess formed at the lower part of the side wall of the cell, or by filling the cells on the mat laying surface, with their side walls, the lower part of which is inwardly recesed, being opposed each other, there will be defined a space for disposing water feeding pipe having a required route at the lower parts between the mutually opposed side walls of the cells, which contributes to excellent working efficiency of the plant cultivating facility.

Further, by providing a flat shaped water holding layer (or a water reservoir layer) on the mat laying surface of the plant cultivation mat, a part of excess water, such as irrigation water by watering-pot, etc., rain water, and others from above the plant cultivation mat is absorbed and stored in this water holding layer through the water passage port formed in the bottom part of each cell without its being drained, if and when the plant growing ingredients (earth brought from other place and mixed with the soil, light weight artificial soil, and so forth) are filled in the plant cultivation mat for the purpose of sowing seeds, or planting grasses and shrubs, or else.

On account of this, in case the plant growing ingredients in the cell should run short of water, the water content in the water holding layer should be conducted through the openings perforated in the bottom part of the cell, introduced into the water passage port by the capillary action, and absorbed into the plant cultivation mat. Owing to this, the water holding layer constitutes the water supply source for the plant growing ingredients, which alleviates any anxiety of water-shortage to thereby greatly contribute to the growth of seeds and plants, thus facilitating their controls.

Furthermore, by disposing the water supply pipe in the space for laying water supply pipe over the surface of the water holding layer, and by feeding water through small perforations formed around the water supply pipe, the required amount of water can be stored in the water holding layer. As the consequence, if and when the water content in the soil filled in the plant cultivation mat runs short, the water is taken into the mat through the water-passage port perforated in the bottom part of the plant cultivation mat, whereby the seeds spread over the plant growing ingredients or nurturing of the plants on the plant cultivation mat can be maintained favorably, which further facilitates control of the plant cultivation mat.

Best Mode for Practicing the Invention

In the following, detailed explanations of the present invention will be given with reference to preferred embodiments. It should however be understood that the invention is not limited to these embodiments alone, but any changes and modifications may be made to the basic concept, without departing from the spirit and scope of the invention, as recited in the appended claims.

Figure 2:
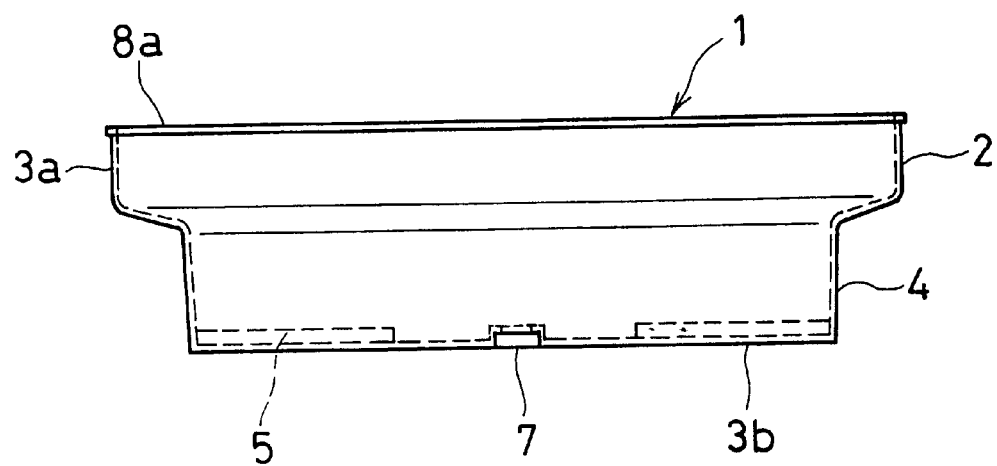
FIG. 2 is a front view of the plant cultivation mat shown in FIG. 1.
Figure 3:
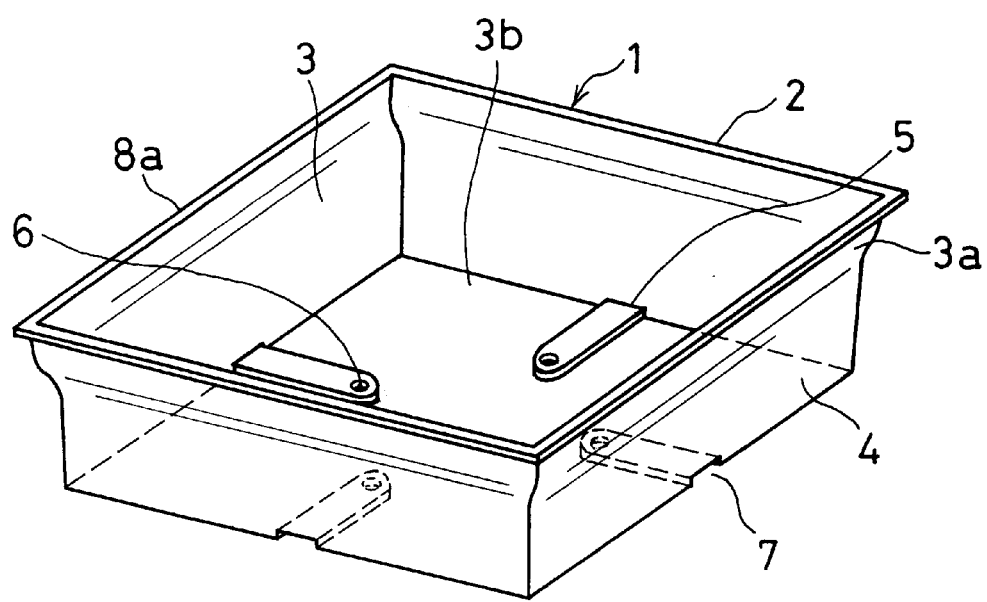
FIG. 3 is a perspective view of the plant cultivation mat shown in FIG. 1.

As shown in FIGS. 1 to 3, the plant cultivation mat 1 according to the first embodiment of the present invention is made up of a square mat frame 2 consisting of a single cell 3 which is so depressed as to permit its top part to open, an inwardly recessed part 4 being formed at the lower part of the four side walls 3a of the cell 3.

Raised parts 5 are formed from the lower part of the side walls 3a of the cell 3 toward the center of its bottom part 3b, a water passage port 6 being perforated at an appropriate location in the upper end surface of each of the raised parts 5, situated in the vicinity of the center of the bottom part 3b. The inside of the raised part 5 is of such a construction that it constitutes a space in an inverted "U" shape, and has an opening 7 in a depressed groove, excess water being discharged outside through this groove-shaped opening 7. The shape, size, number, and so on of the water passage port 6 and the opening 7 are determined arbitrarily in accordance with the construction of the mat frame 2 and the cell 3, which may be sufficient, if they are positioned at the bottom part 3b or in the vicinity of the bottom part 3b. The same can be said of each and every mode of embodiment to be described hereinbelow.

A peripheral rib 8a is formed on and around the periphery of the mat frame 2 as a reinforcement which may be dispensed with, if the mat frame 2 itself has a required mechanical strength. The same can be said of each and every mode of embodiment to be described hereinbelow.

The material for the mat frame 2 should preferably be selected from among the synthetic resins such as vinyl chloride, polypropylene, polyethylene, and polystyrene. It is shaped by various molding method such as the vacuum molding method, the blow molding method, the injection molding method, the extrusion molding method, and so forth. The size of the mat frame 2 should, for example, be 25 cm×25 cm, 25 cm×50 cm, 50 cm×50 cm, and others.

In the following, explanations will be given as to a modified example similar to the first embodiment of the present invention.

Figure 4:
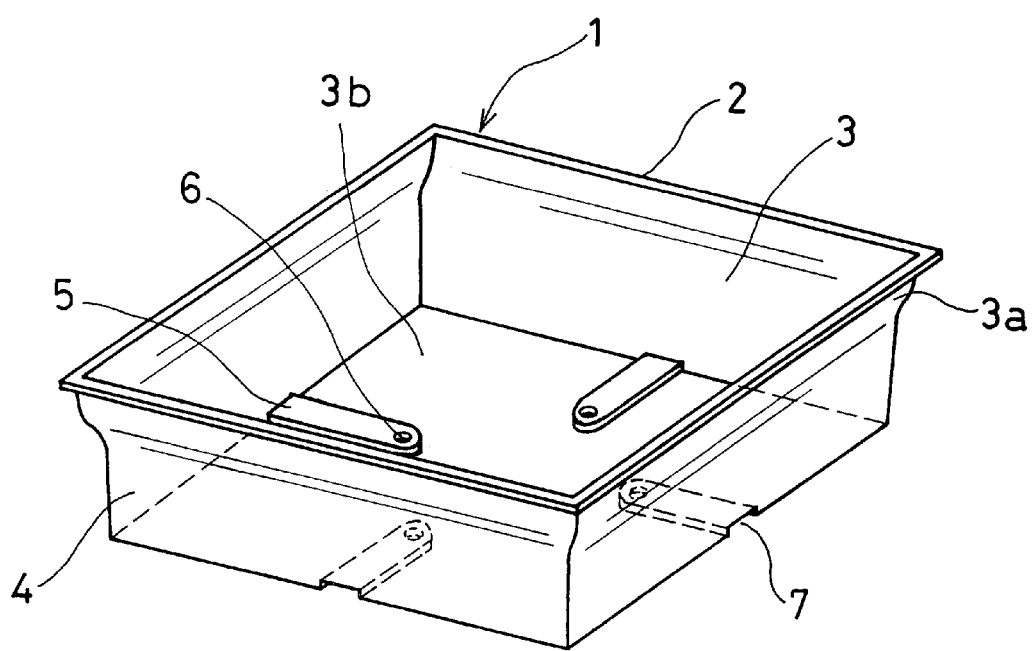
FIG. 4 is a perspective view of a first modified example of the first embodiment of the plant cultivation mat according to the present invention.

Referring to FIG. 4 illustrating this first modified example of the present invention, the cell 3 is constructed with a single mat frame 2 having four side walls 3a, of which the three side walls 3a are inwardly recessed at their lower part to form an inwardly recessed part 4. The remaining one side wall 3a constitutes a mildly and inwardly tapered face extending from its top to the bottom.

Figure 5:
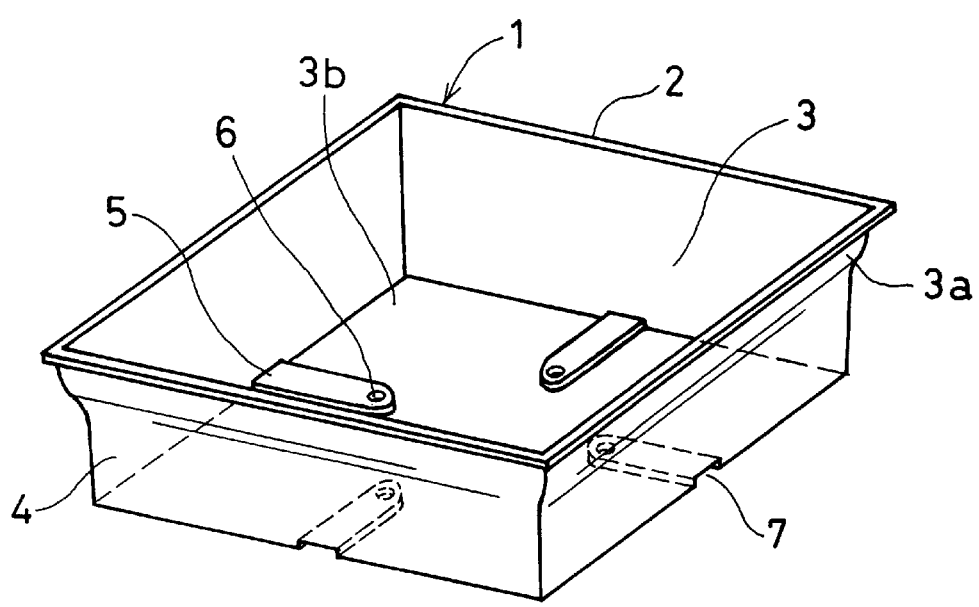
FIG. 5 is a perspective view of a second modified example of the first embodiment of the plant cultivation mat according to the present invention.

The second modified example of this first embodiment is of such a construction that, as shown in FIG. 5, the mutually adjacent two side walls 3a out of the four side walls 3a are inwardly recessed at their lower part to thereby form the inwardly recessed part 4, and that the other two adjacent side walls 3a form the mildly and inwardly tapered faces extending from the top to the bottom.

Figure 6:
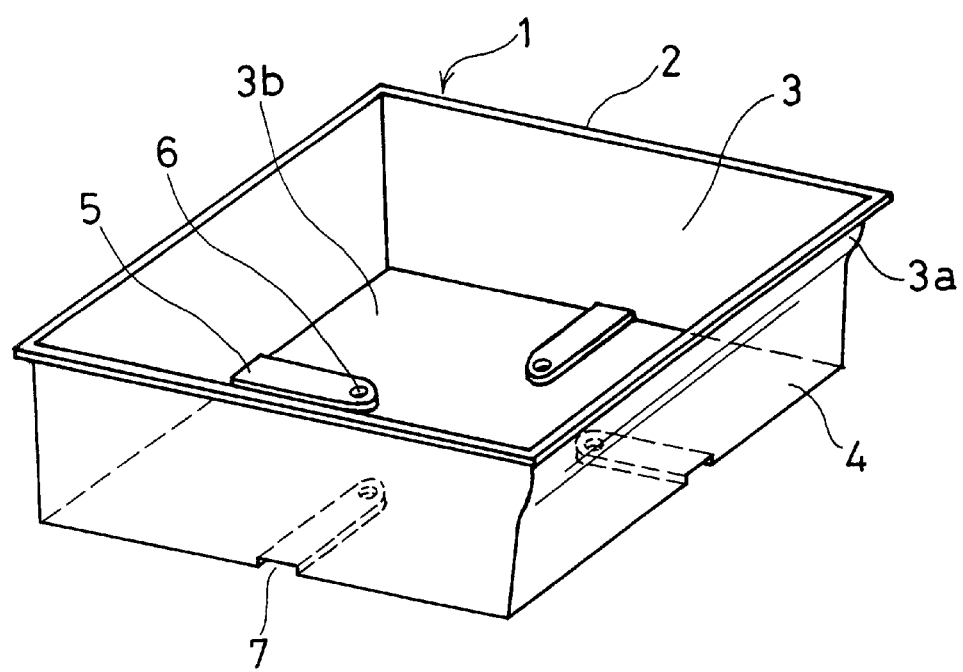
FIG. 6 is a perspective view of a third modified example of the first embodiment of the plant cultivation mat according to the present invention.

The third modified example of this first embodiment is of such a construction that, as shown in FIG. 6, the cell 3 is formed of a single mat frame 2 having four side walls 3a, of which one side wall 3a is recessed inwardly at its lower part to form an inwardly recessed part 4, and that the other three side walls 3a constitute the mildly and inwardly tapered faces extending from its top to the bottom.

Figure 7:
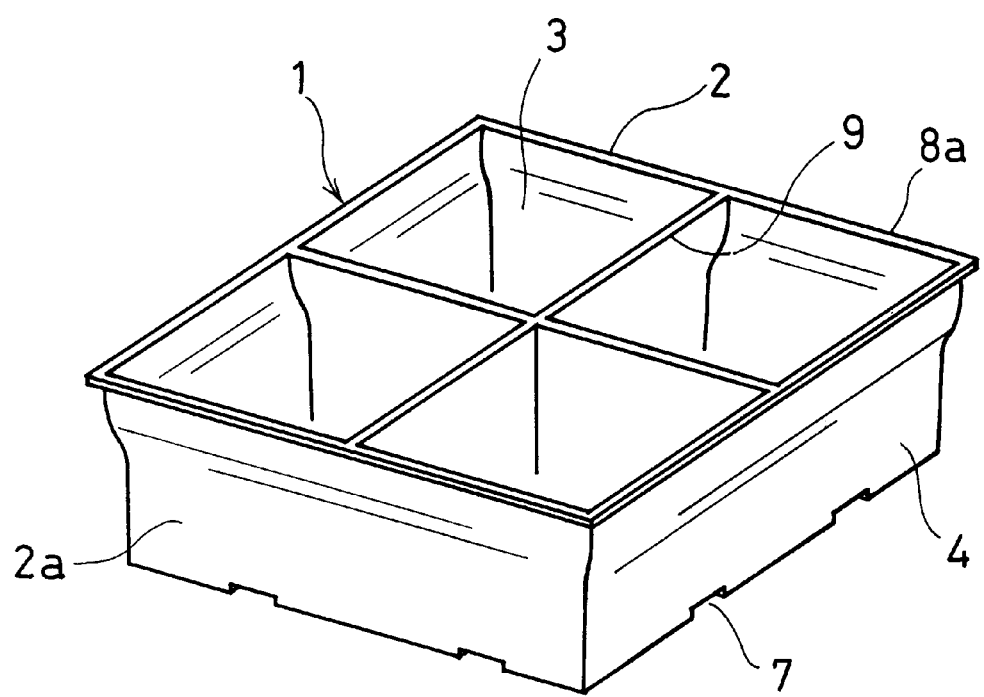
FIG. 7 is a perspective view showing the second embodiment of the plant cultivation mat according to the present invention.

In the next place, explanations will be given as to the second embodiment of the plant cultivation mat 1 according to the present invention. As shown in FIG. 7, the plant cultivation mat 1 is formed of a square mat frame 2, each of the four walls 2a of the surrounding side faces forming an inwardly recessed part 4 at its lower part. Within the mat frame 2, there is disposed a partition member 9 in a cross-shape, at a height not exceeding the upper end of the mat frame 2, i.e., at a height in flush with, or slightly lower than, the peripheral rib 8a of the mat frame 2, thereby defining four cells 3 in the mat frame 2.

Besides the example as illustrated in the drawing, the partition member 9 has its shape of intersection, grating, and others. This partition member 9 can also be molded as an integral part of the mat frame 2, or be disposed inside the mat frame 2 as a separate member, or may take any other arbitrary configuration. Such construction of the partition member 9 can be applied to the plant cultivation mat 1 as a modified example of the second embodiment to be described subsequently.

In the following, a first modification similar to the second embodiment of the plant cultivation mat 1 according to the present invention will be explained in reference to the drawing.

Figure 8:
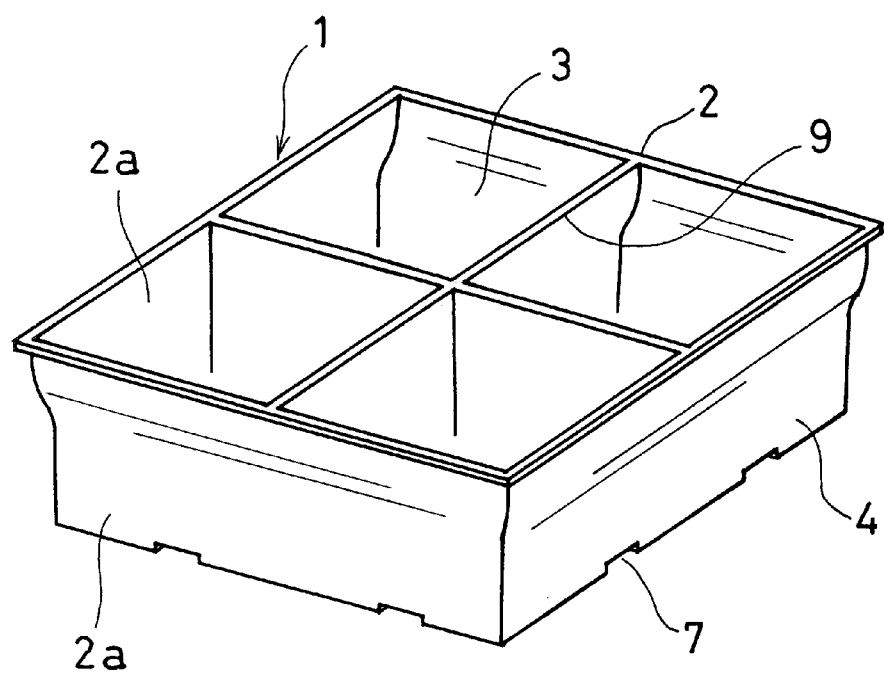
FIG. 8 is a perspective view of the first modification of the second embodiment of the plant cultivation mat according to the present invention.

As shown in FIG. 8, of the side walls 2a of the square mat frame 2, each of the three side walls 2a has an inwardly recessed part 4 formed at its lower part, the remaining one side wall 2a having a mildly and inwardly tapered wall face extending from its top to the bottom.

Figure 9:
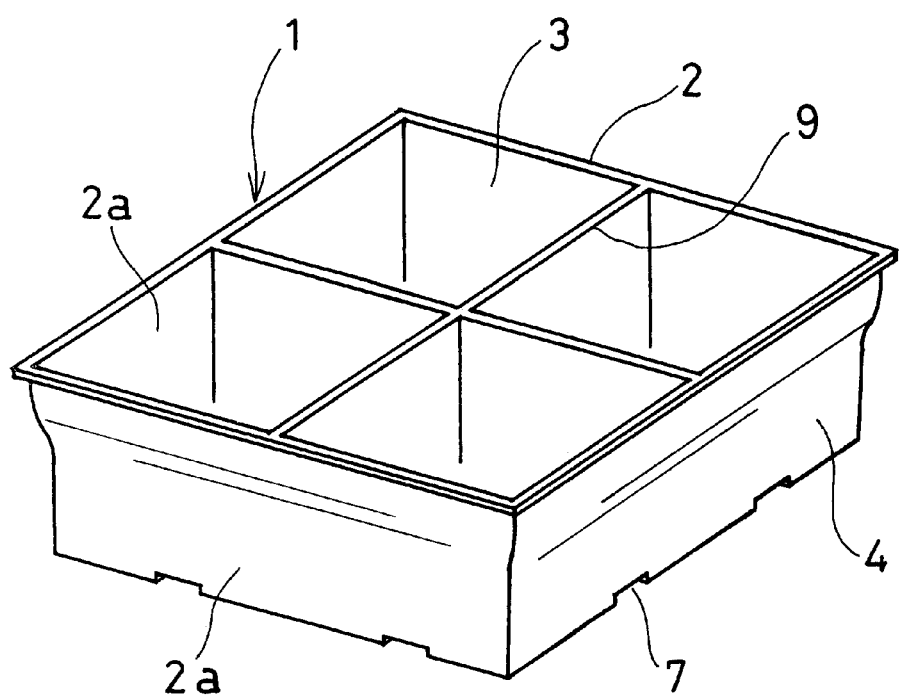
FIG. 9 is a perspective view of the second modification of the second embodiment of the plant cultivation mat according to the present invention.

The second modified example of this second embodiment is of such a construction that, as shown in FIG. 9, the mutually adjacent two side walls 2a out of the four side walls 2a are inwardly recessed at their lower part to thereby form the inwardly recessed part 4, and that the other two adjacent side walls 2a form the mildly and inwardly tapered faces extending from their top to the bottom.

Figure 10:
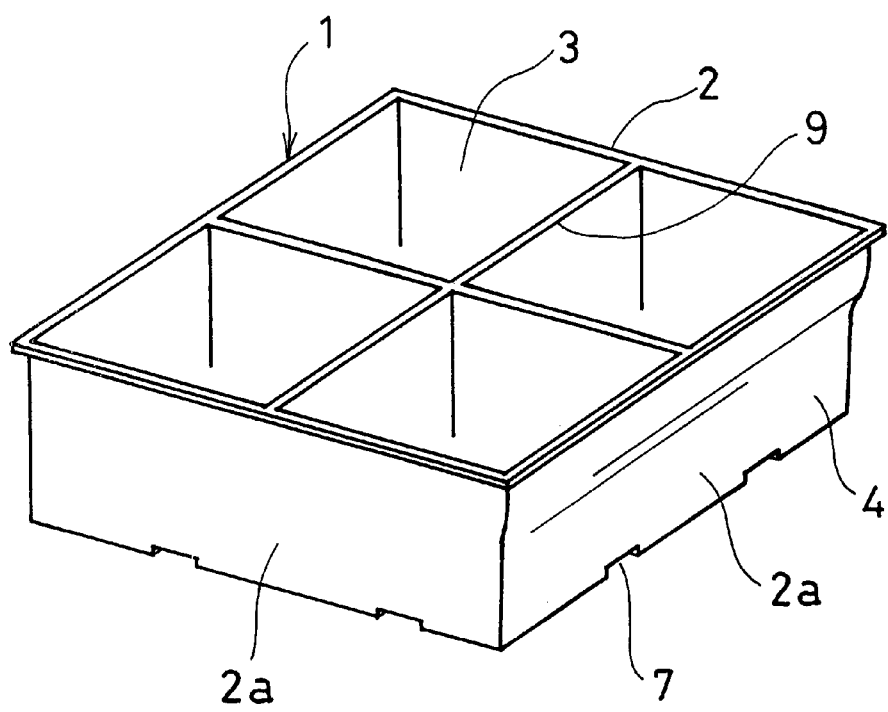
FIG. 10 is a perspective view of the third modification of the second embodiment of the plant cultivation mat according to the present invention.

The third modified example of this second embodiment is of such a construction that, as shown in FIG. 10, of the four side walls 2a of the square mat frame 2, one side wall 2a has an inwardly recessed part 4 at its lower part, and that the other three side walls 2a constitute the mildly and inwardly tapered face extending from its top to the bottom.

Figure 11:
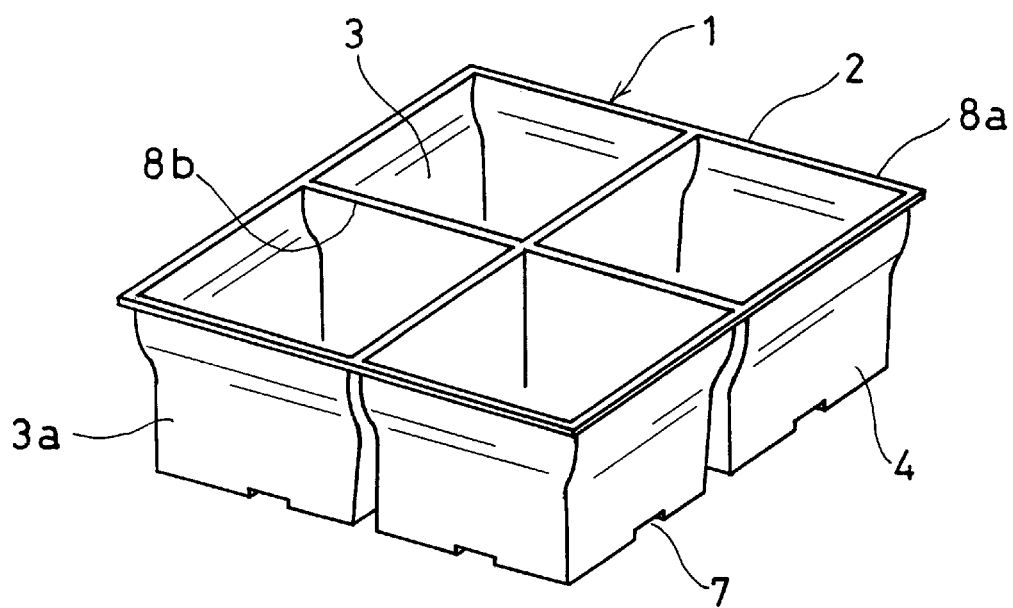
FIG. 11 is a perspective view showing the third embodiment of the plant cultivation mat according to the present invention.

In the following, the third embodiment of the plant cultivation mat 1 according to the present invention will be described in reference to the drawing. As shown in FIG. 11, this plant cultivation mat 1 is constructed with a mat frame 2 comprising four substantially square-shaped cells 3, each of which is disposed in a depressed form to permit the top part thereof to open, the adjacent cells 3 being mutually connected together by means of a connecting rib 8b at their upper end part. Around the outer periphery of the mat frame 2, there is provided, on the upper part of the cell 3, a peripheral rib 8a at a substantially same height as the connecting rib 8b. And, the inwardly recessed part 4 is formed at the lower part of the external side wall 3a of the four cells 3 which are positioned on the four side faces of the mat frame 2.

Both peripheral edge rib 8a and connecting rib 8b are required to have their thickness such that they are given flexibility to sufficiently conform to irregularity on the mat laying surface (slab), and others, and that, at the same time, they have mechanical strength of an extent such as to permit the mat frame 2 to withstand against crushing, even when a person treads on the mat frame 2 either directly or by way of walking board. In this manner, the mat frame 2 is sustained by the bottom part 3b of a plurality of cells 3 to exhibit a sense of stability, even if it is subjected to bending, hence it takes a shape that can be laid over the slab surface such as roof-top, etc. Incidentally, depending on occasion, the connecting rib 8b can be provided as a separate body.

For other construction of the plant cultivation mat 1, a raised part 5 is formed at the lower part of the side wall 3a of the cell 3 extending toward the center of the bottom part 3b, and a water-passage port 6 is perforated at an appropriate location on the upper end surface of the raised part 5 situated in the vicinity of the center of the bottom part 3b. Inside the raised part 5, there is formed a space in an inverted "U" shape, which constitutes an opening 7 in the shape of a concave groove, excess water being drained through the opening 7.

Figure 12:
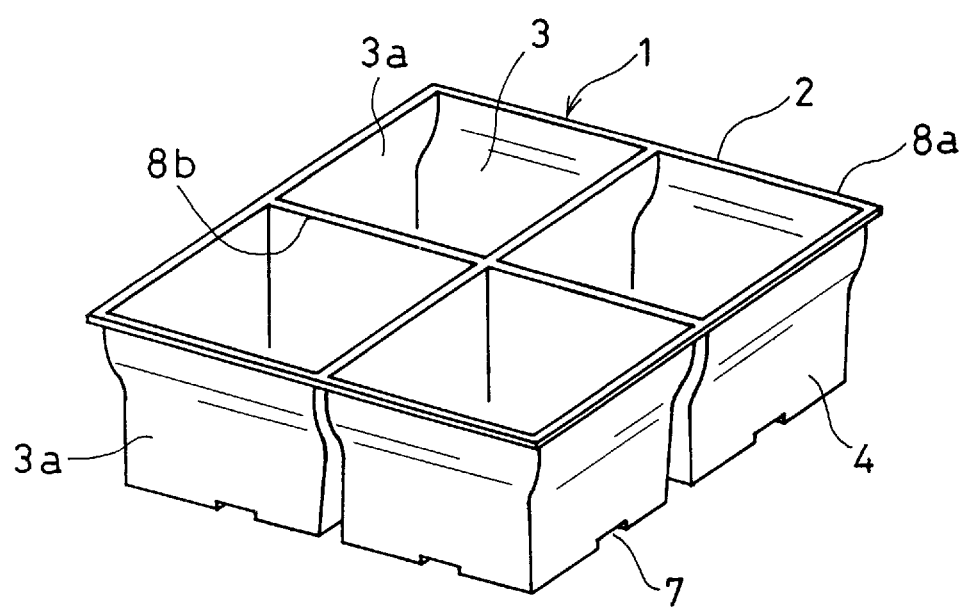
FIG. 12 is a perspective view of the first modification of the third embodiment of the plant cultivation mat according to the present invention.
Figure 13:
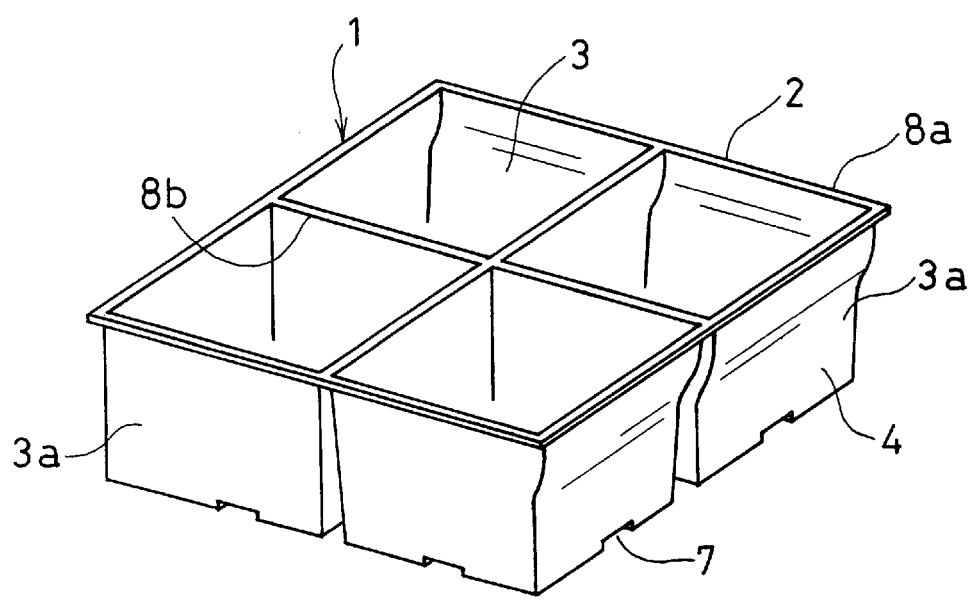
FIG. 13 is a perspective view of the second modification of the third embodiment of the plant cultivation mat according to the present invention.
Figure 14:
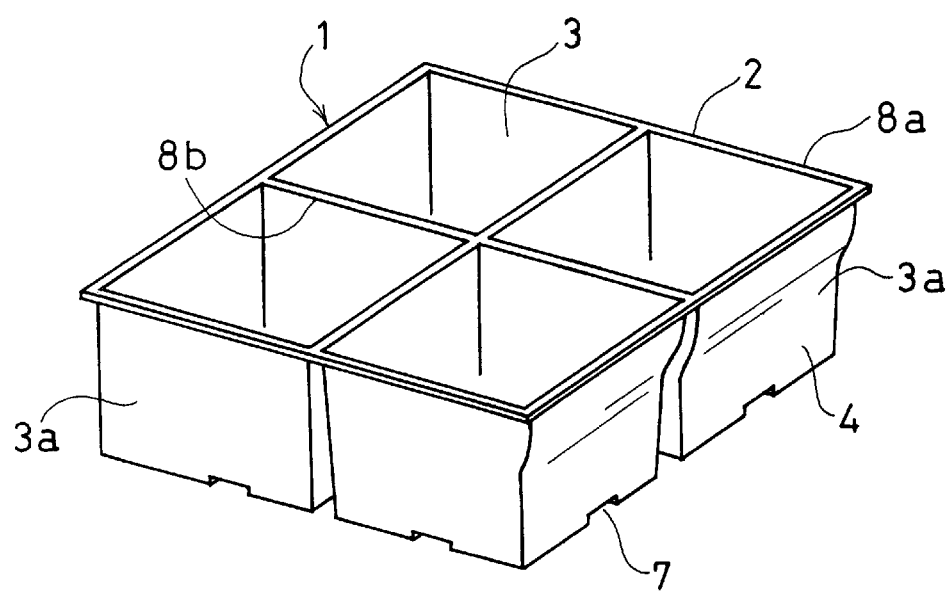
FIG. 14 is a perspective view of the third modification of the third embodiment of the plant cultivation mat according to the present invention.

The plant cultivation mat 1 according to this third embodiment can be applied to those illustrated in FIGS. 12 to 14 as the similar modifications, wherein the inwardly recessed part 4 is formed at the lower part of the external side walls 3a in the predetermined number of the cell 3 positioned at three side faces, two side faces, and a single side face.

Figure 15:
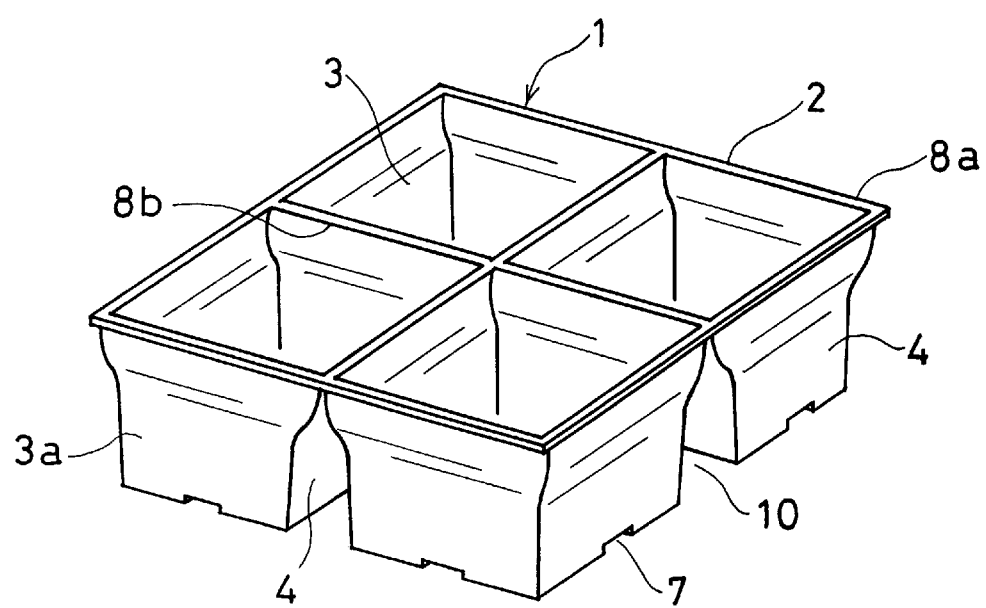
FIG. 15 is a perspective view showing the fourth embodiment of the plant cultivation mat according to the present invention.

In the following, explanations will be given as to the fourth embodiment of the plant cultivation mat 1 according to the present invention. As shown in FIG. 15, the plant cultivation mat 1 of this mode of embodiment is of such construction that four plant cultivation mats 1 of the first embodiment are connected together at their upper end part by means of the peripheral rib 8a and the connecting rib 8b, as an integral whole. The other construction of this plant cultivation mat 1, such as forming the inwardly recessed part 4 at the lower part of the side wall 3a of each cell 3, perforating the water-passage port 6 in the bottom part 3b of each cell 3, and others, is the same as in the afore-described first embodiment.

Both peripheral edge rib 8a and connecting rib 8b are required to have their thickness such that they are given flexibility to sufficieny conform to irregularity on the mat laying surface (slab), and other inconveniences, and that, at the same time, they have mechanical strength of an extent such as to permit the mat frame 2 to withstand against crushing, even if a person treads on the mat frame 2 either directly or by way of walking board. Further consideration should be given to maintain these peripheral edge rib 8a and the connecting rib 8b in the same thickness as that of the cell 3.

In view of the fact that the number of cell 3 to constitute the mat frame 2 is four, there can be formed a space 10 in a substantially inverted "U" shape at the bottom part of the cells between the mutually opposed side walls 3a thereof as connected together. That is to say, the space 10 in a cross-shape is formed at the lower part of the connecting rib 8b of the mat frame 2.

Figure 16:
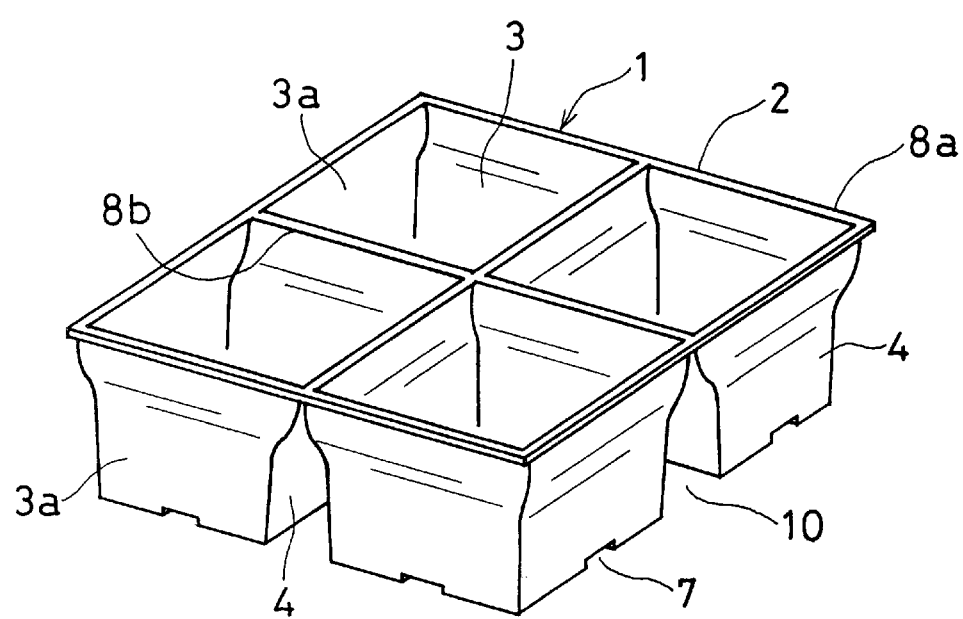
FIG. 16 is a perspective view of the first modification of the fourth embodiment of the plant cultivation mat according to the present invention.
Figure 17:
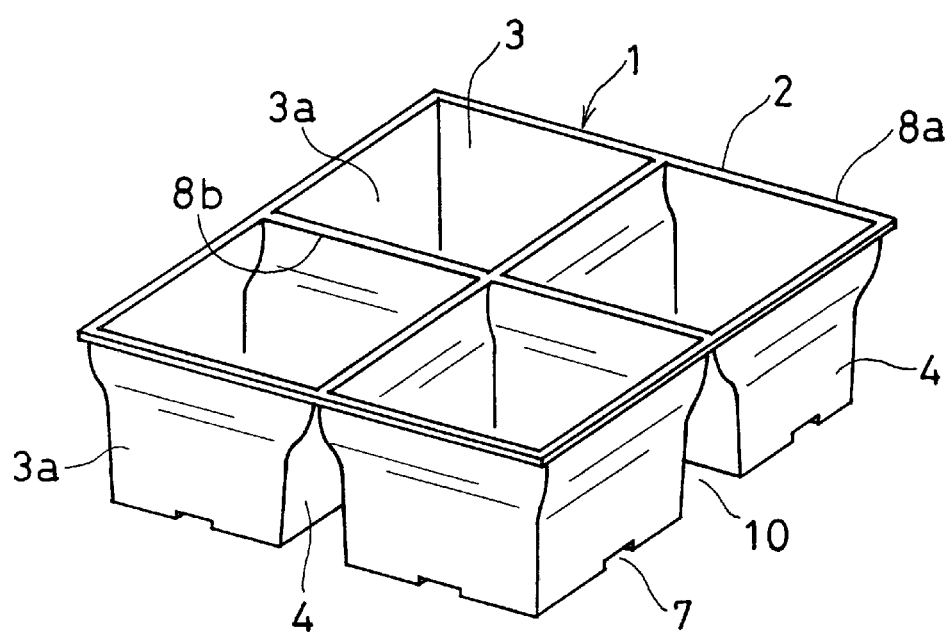
FIG. 17 is a perspective view of the second modification of the fourth embodiment of the plant cultivation mat according to the present invention.
Figure 18:
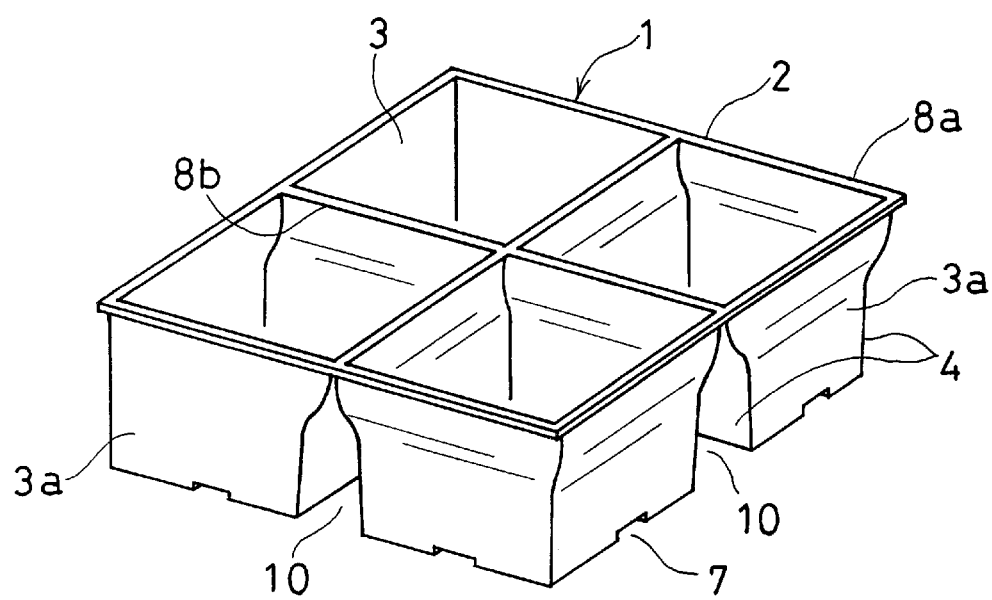
FIG. 18 is a perspective view of the third modification of the fourth embodiment of the plant cultivation mat according to the present invention.
Figure 19:
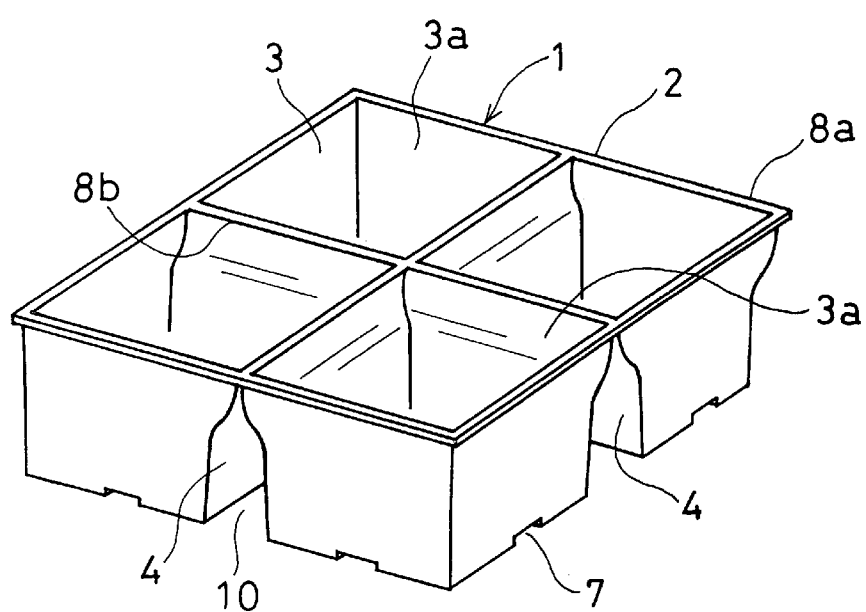
FIG. 19 is a perspective view of the fourth modification of the fourth embodiment of the plant cultivation mat according to the present invention.

Here, FIGS. 16 to 19 illustrate modifications similar to the fourth embodiment of the plant cultivation mat 1 according to the present invention. As shown in FIGS. 16 to 18, the plant cultivation mat 1 may be constructed, as a matter of course, in the form, wherein the mat frame 2 is provided with the inwardly recessed part 4 at the lower part of the external side wall 3a in its predetermined number, the inwardly recessed part being positioned at the three side faces, the two side faces, and a single side face, respectively; or in the form, wherein the mat frame 2, as shown in FIG. 19, has no inwardly recessed part 4 formed on the external wall 3a.

By the way, in the afore-described plant cultivation mat 1, the number of cells 3 to be provided in the depressed form in the mat frame 2 is selected to be four. However, the number of this cell 3 is not limited to four, but any arbitrary number of the same can be chosen, such as, for example, six, eight, nine, and so on. Further, those plant cultivation mats 1 as described in the first, second and third embodiments can be used, as each independent plant cultivation mat 1, by filling in it, through a medium of filter, the plant growing ingredients 12 such as earth brought from other place and mixed with the soil, light weight artificial soil, and so on, and then by sowing seeds, or by planting earth-covering plants such as lawn, etc., grasses and shrubs, and others.

Figure 20:
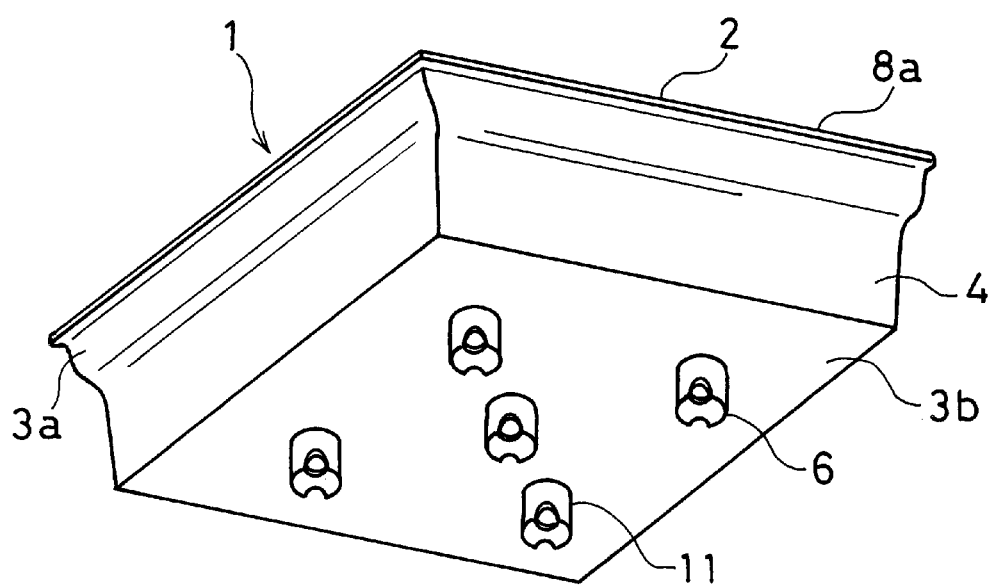
FIG. 20 is a bottom perspective view showing the fifth embodiment of the plant cultivation mat according to the present invention.

In the following, explanations will be given as to the fifth embodiment of the plant cultivation mat 1 according to the present invention. As shown in FIG. 20, the plant cultivation mat 1 of this embodiment is of such construction that a single cell 3 forms a mat frame 2, the four side walls 3a of which are inwardly recessed at their lower parts, therby forming the inwardly recessed part 4.

Figure 21:
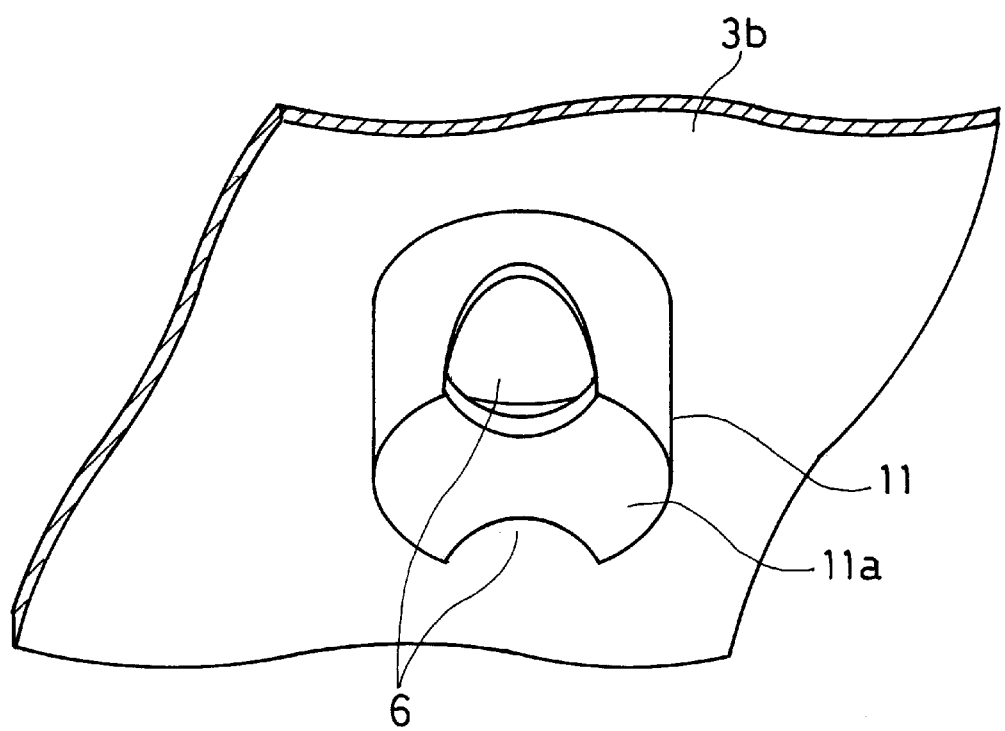
FIG. 21 is a perspective view, in part, of a hollow recess in the fifth embodiment of the plant cultivation mat according to the present invention.

This plant cultivation mat 1 is of a similar construction to the plant cultivation mat of the first embodiment, with the exception that hollow concave parts 11 are protruded downwardly from the bottom part 3b of the cell 3, each concave part 11 being in a predetermined size, with the level of the bottom part 3b being moved upward by the abovementioned predetermined size, and with a water-passage port 6 being perforated in the vicinity of the bottom part 11a of each hollow concave part 11 (vide: FIG. 21).

In the example shown in FIG. 20, the inwardly recessed part 4 is formed on all four side walls 3a at their lower part. Besides this, however, it is feasible to form the inwardly recessed part 4 on those three side faces, the two side faces, or a single side face alone, as is the case with the afore-described each embodiment.

Figure 22:
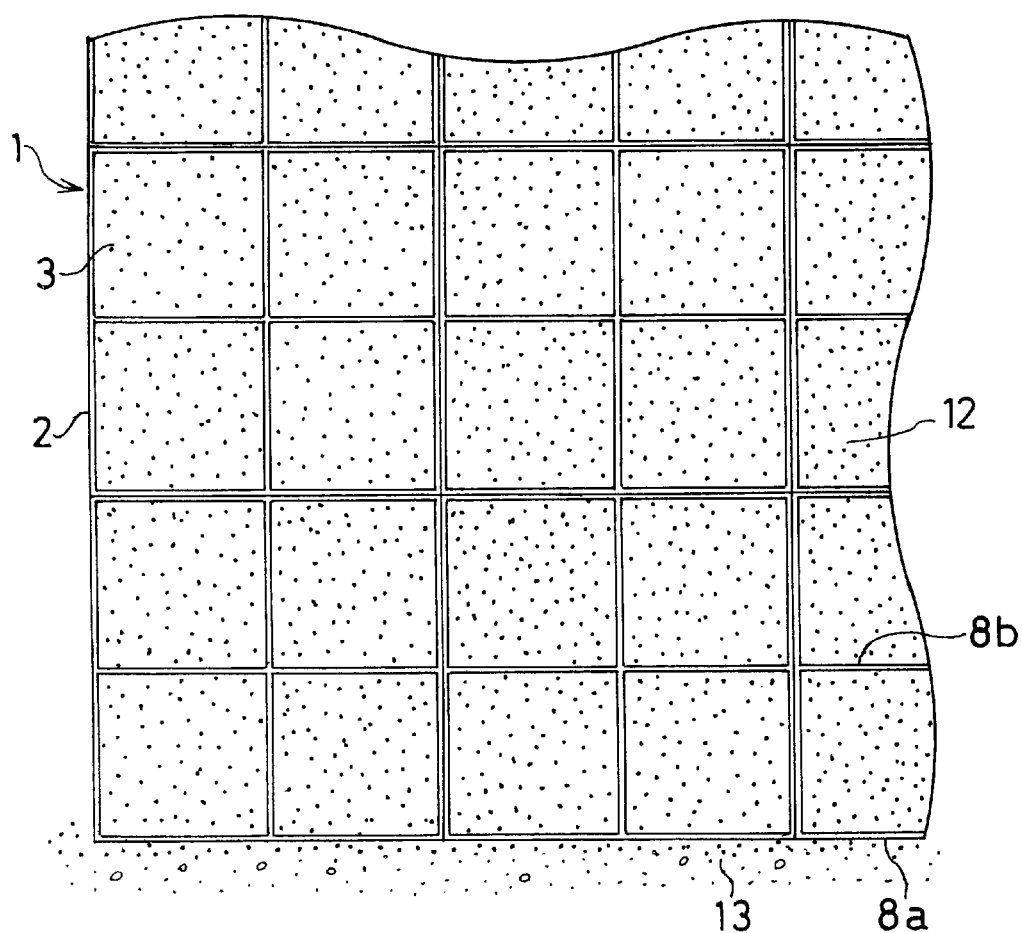
FIG. 22 is a plan view of the first embodiment of the method for laying the plant cultivation mat according to the present invention.

In the following, explanations will be given as to how the plant cultivation mat 1 of the above-described construction will actually be laid over a mat laying surface 13, in refernce to FIGS. 22 and 23, the former being a plan view of the first embodiment of the method for laying the plant cultivation mat 1, while the latter being a front view thereof.

In this mat-laying embodiment, use is made of the plant cultivation mat 1, as shown in FIG. 13, with the inwardly recessed part 4 being formed at the lower part of the side walls 3a of each cell 3 positioned on the mutually adjacent two side faces of the mat frame 2, and the earth brought from other place and mixed with the soil, as the plant growing ingredients 12, is filled in each cell 3.

After this, the inwardly recessed part 4 which has been formed arbitrarily on the side wall 3a of the cell 3 is mutually opposed, and then a plurality of the plant cultivation mats 1 are spread over the mat laying surface 13 such as roof top, veranda, terrace, etc., thereby forming a space 10 in a substantially inverted "U" shape having a required passage route at the lower part of the cells 3 constituting the cell 2. This space 10 serves as the space for installing the water supply 15 pipe to be described later.

Figure 23:
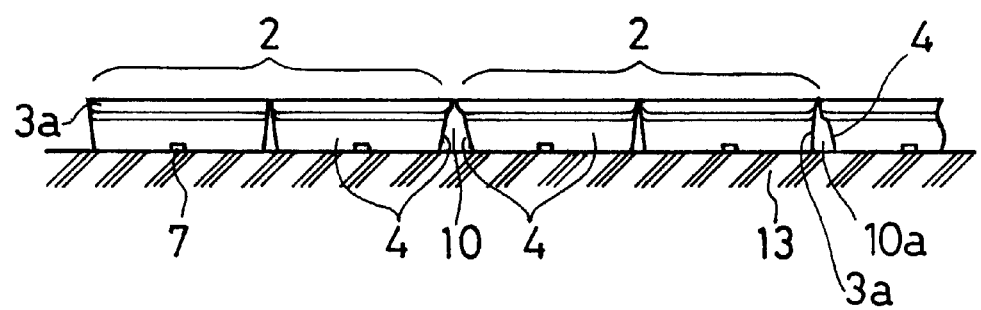
FIG. 23 is a front view of FIG. 22.

Further, in the case of spreading the plant cultivation mats 1 by mutually opposing the side wall 3a of the cell 3 forming the mildly and inwardly tapered face extending from the top toward the bottom and the inwardly recessed part 4 formed on the lower part of the side wall 3a of the cell 3, there will be formed a space 10a as shown in FIG. 23. While this space 10a is smaller than the abovementioned space 10, it is still useful for installing the water-supply pipe 15 of a small diameter.

The filling of the plant growing ingredients 12 in the plant cultivation mat 1, and the subsequent seed-sowing, plantation of earth-covering plants such as lawn, etc., other grasses, shrubs, etc. may be done either before or after the laying of the plant cultivation mat 1 over the mat laying surface 13. The seeds and plants in the plant cultivation mat 1 thus laid, as mentioned above, can be grown by rainfall, water-irrigation from a watering pot, etc., above, and so forth.

Various modes of embodiment of the mat laying method will be described hereinbelow with reference to the accompanying drawing.

First of all, in the case of the plant cultivation mat 1 with the in wardly recessed part 4 being formed at the lower part of the four side faces of the mat frame 2 (vide: FIGS. 3, 7, 11 and 15), the space 10 in a substantially inverted "U" shape can be formed between the mutually opposed side walls 2a, 3a of the mat frame 2 or those of each cell 3, whereby the space 10 connecting the cells in the lattice form, as a whole, is constructed.

By the way, in the example shown in FIG. 15, since the space 10 in the substantially inverted "U" shape is formed beforehand in a cross-shape at the lower part of the connecting rib 8b of the mat frame 2, it is possible to form the continuous space part 10 in the lattice shape, which is twice as many as that in the mat-laying example as shown in FIGS. 20 and 21.

Further, in the case of the plant cultivation mat 1 having the inwardly recessed part 4 being formed at the lower part of the three side faces, the two side faces, or a single side face of the mat frame 2 (vide: FIGS. 4 to 6; FIGS. 8 to 10; FIGS. 12 to 14; and FIGS. 16 to 18), the inwardly recessed part 4 of each cell 3 is made to oppose each other for spreading on the laying surface, whereby the space 10 in the substantially inverted "U" shape is formed on this part, whereby a continuous space 10 having a required route, as a whole, can be constructed.

In addition, according to the examples as illustrated in FIGS. 16 to 18, which are modifications of FIG. 15, since the space 10 in a substantially inverted "U" shape is formed beforehand in a cross shape at the lower part of the connecting rib 8b of the mat frame 2, there is additionally constructed a continuous space 10 in the lattice form.

Also, since the mat frame 2 as shown in FIG. 19 has the space 10 in the substantially inverted "U" shape of a cross shape formed in the lower part of the continuous rib 8b of each cell 3, by the space 10 of which there can be constructed the continuous space 10 in the lattice form.

Further explanations will be given in the following as to the method for laying the plant cultivation mat 1 by first providing the water holding layer 14 on the mat laying surface 13, then laying the plant cultivation mat 1 over the water holding layer 14, and then disposing the water supply pipe 15.

Figure 24:
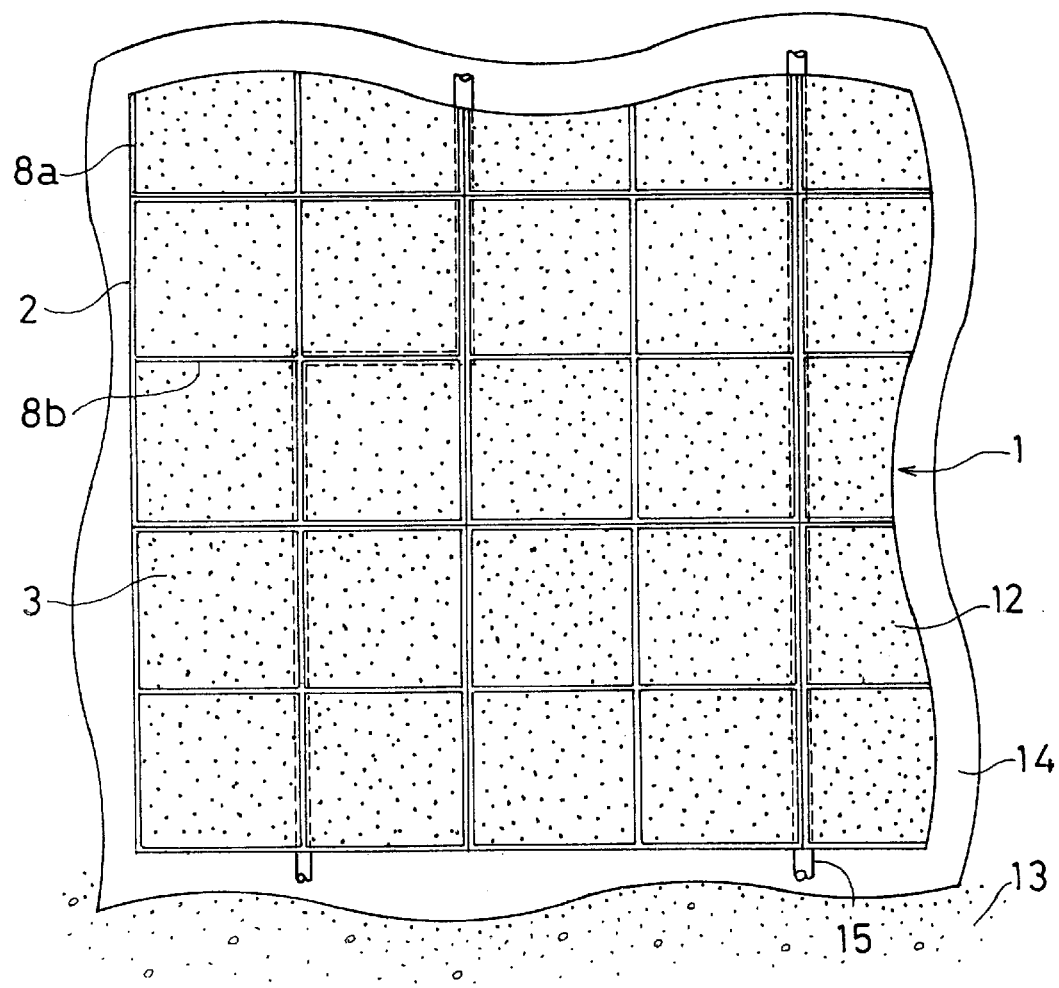
FIG. 24 is a plan view showing the second embodiment of the method for laying the plant cultivation mat according to the present invention.
Figure 25:
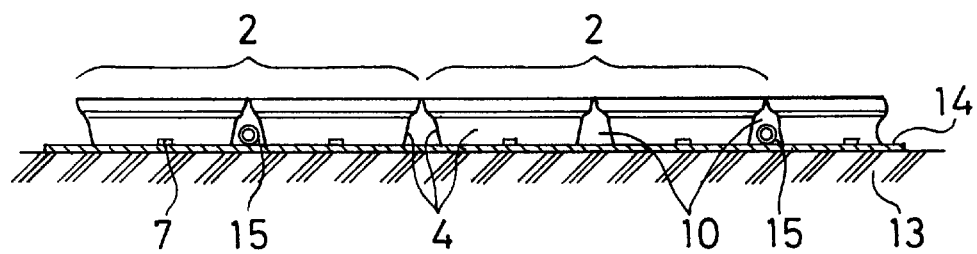
FIG. 25 is a front view of FIG. 24.
Figure 26:
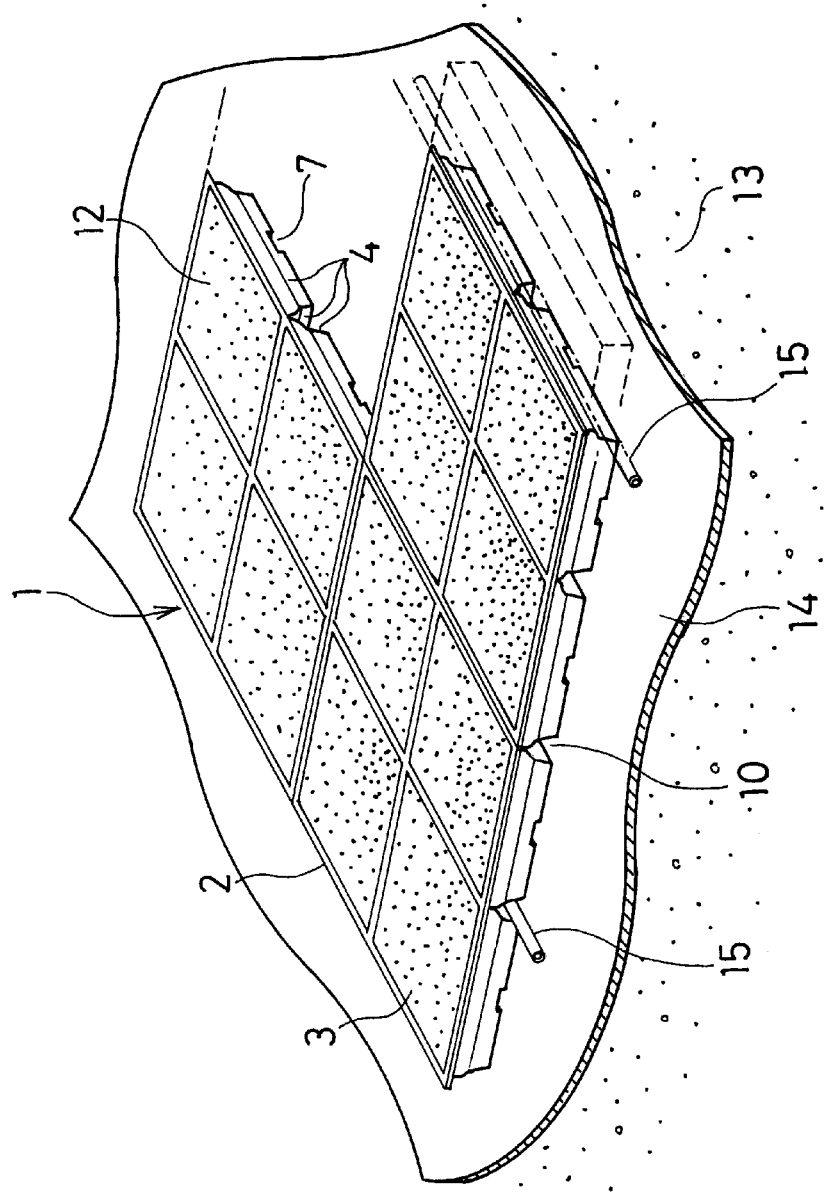
FIG. 26 is a perspective view of FIG. 24.

In the mat laying method according to this embodiment, the water holding layer 14 of a flat shape is laid over this mat laying surface 13 to thereby spread the plant cultivation mat 1 thereover, as shown in FIGS. 24 to 26. The above illustrated example uses a plurality of plant cultivation mats 1 shown in FIG. 15, and light weight artificial soil as the plant growing ingredient 12 is filled in each cell 3. As the water holding layer 14 to be laid, use may be made of woven cloth, non-woven cloth, felt, water-absorbing polymer worked into a sheet form, or a composite article of these materials, all being made of chemical fibers or natural fibers.

When the plant cultivation mat 1 is to be laid on the mat laying surface 13, the water supply pipe 15 is disposed on the water holding layer 14, in a manner to run along the required route of the space part 10, at a position of the space 10 to be formed at the lower part of the mutually adjacent plant cultivation mat 1 and the cross-shaped space 10 defined at the lower part of the mat frame 2, followed by laying the plant cultivation mat 1 in a manner to cover the water supply pipe 15 disposed at the position of the space 10.

That is to say, after the flat shaped water holding layer 14 is formed on the mat laying surface 13 such as the roof top, the veranda, the terrace, and so on, a plurality of plant cultivation mats 1 are spread over this mat laying surface 13 to thereby continuously form the space 10 in the substantially inverted "U" shape in the lattice form, and having a required route at the lower part of mutually adjacent cells 3 as well as at the lower part of the connecting rib 8b of each mat frame 2.

In this way, there is established a state, wherein the water supply pipe 15 is disposed in the space 10, which serves an important role as the space 10 for disposing the water supply pipe 15. Also, the abovementioned space 10a serves an important role as a space for disposing thin water supply pipe 15. This water supply pipe 15 is connected to a pressurizing device for water irrigation to constitute, as a whole, a water irrigation device.

Incidentally, it should be noted that filling work of the plant growing ingredients 12, the seed-sowing work, the plantation of the earth-covering plants such as lawn, etc., or grasses and shrubs, etc. may be done either before or after laying of the plant cultivation mat 1.

By provision of the water holding layer 14 as mentioned above, a part of excess water from sprinkling of water from above by use of a watering pot, etc., or falling of rain water can be stored in the water holding layer 14 without being discharged into a water draining pipe, while, on the other hand, if and when the plant growing ingredients 12 in the cell 3 runs short of water, the water content in the water holding layer 14 is introduced through the water passage port 6 in the bottom part 3b by the capillary action. As the consequence, the water holding layer 14 constitutes the water feeding source for the plant growing ingredients 12, whereby there is no apprehension of water shortage, which remarkably contributes to the growth of plants and also facilitates control of the plant cultivation mat 1.

And, owing to the presence of the water holding layer 14, even when the amount of the plant growing ingredients 12 to be the culture medium for the plant growth is decreased, it is possible to retain the water content, which is the essential conditions for the plant growth, to a favorable degree, thereby making it possible to reduce the undesirable overload to the mat laying surface 13 such as the roof top, veranda, terrace, and so forth of a building.

Furthermore, growing and spreading of the plant roots, which project from the water passage port 6 situated at the bottom part 3b of the plant cultivation mat 1 are positioned on or in the water holding layer 14 without deteriorating the mat laying surface 13 for the plant cultivation, thereby playing the role of the root protection.

By the way, at the time of filling the mat laying surface 13 with the plant cultivation mat 1, an appropriate shape of the plant cultivation mat 1 can be arbitrarily selected from among various types. Any combination of the various types of the plant cultivation mat 1 can be effected, the adaptability of which is very high. Also, the plant cultivation mat 1 according to the present invention is not limited to those shapes as illustrated in the drawing, but any types of the plant cultivation mat 1 can be included within the scope of the invention.

Since the plant cultivation mat 1 according to the present invention and the method for its laying is as described in the foregoing, it can be applied to those existing buildings, with further effect such that its laying and removing works do not need much working time, labor, and cost for its laying.

Furthermore, the invention is capable of providing the plant cultivation mat 1 and the method for laying the same, with the facilitated control of the soil and the water content.

Although the invention has so far been described in detail with reference to the preferred embodiments shown in the drawing, those persons skilled in the art may be able to make various improvements and modifications within the spirit and scope of the invention as recited in the appended claims.

What is claimed is:

1. A plant cultivation mat, which comprises a plurality of mutually connected cells with water-passage ports being perforated in the vicinity of the bottom part thereof, said plurality of cells constituting a mat frame having a depressed form to permit the top part thereof to open, each of said plurality of cells having side walls which are substantially straight in a horizontal direction and an inwardly recessed part being formed at the lower part of at least one of the side walls of each of said plurality of cells, wherein each of any two connected cells among said plurality of cells has a side wall which faces a side wall of the other of the two connected cells and is substantially parallel thereto in a horizontal direction.

2. A plant cultivation mat according to claim 1, wherein a raised part having a space therewithin is formed at the bottom part of said cell, said water passage port being perforated in said raised part.

3. A plant cultivation mat according to claim 1, wherein a hollow concave part is formed in downward projection on the bottom part of said cell, and said water passage port is perforated in the vicinity of the bottom part of said hollow concave part.

4. A plant cultivation mat, which comprises a plurality of cells with water-passage ports being perforated in the vicinity of the bottom part thereof, said plurality of cells constituting a mat frame having a depressed form to permit the top part thereof to open, and being mutually connected at the upper end part thereof through a rib, and an inwardly recessed part being formed at the lower part of the side wall of said cell, wherein a raised part having a space therewithin is formed at the bottom part of said cell, said water passage port being perforated in said raised part.

5. A plant cultivation mat, which comprises a plurality of cells with water-passage ports being perforated in the vicinity of the bottom part thereof, said plurality of cells constituting a mat frame having a depressed form to permit the top part thereof to open, and being mutually connected at the upper end part thereof through a rib, and an inwardly recessed part being formed at the lower part of the side wall of said cell, wherein a hollow concave part is formed in downward projection on the bottom part of said cell, and said water passage port is perforated in the vicinity of the bottom part of said hollow concave part.

6. A method for laying a plant cultivation mat which comprises a plurality of mutually connected cells with water-passage ports being perforated in the vicinity of the bottom part thereof, said plurality of cells constituting a mat frame having a depressed form to permit the top part thereof to open, and an inwardly recessed part being formed at the lower part of the side wall of each of said plurality of cells, comprising laying said plant cultivation mat in a manner to define a space within the inwardly recessed part of said cell, and disposing water-supply pipe in an arbitrary route in said space.

7. A method for laying the plant cultivation mat according to claim 6, which further comprises providing a water-holding layer on said mat laying surface, in advance of laying said plant cultivating mat.

8. A method for laying a plant cultivation mat which comprises a mat frame with water-passage ports being perforated in the vicinity of the bottom part thereof, said mat frame having a depressed form to permit the top part thereof to open, and said mat frame having side walls which are substantially straight in a horizontal direction and an inwardly recessed part being formed at the lower part of at least one of the side walls of said mat frame, comprising laying a plurality of said plant cultivation mats adjacently in a manner to define a space for disposing water-supply pipe within the inwardly recessed parts of said mat frame, by the inwardly recessed parts of said plant cultivation mats facing each other and being substantially parallel in a horizontal direction.

9. A method for laying the plant cultivation mat according to claim 8, which further comprises disposing water-supply pipe in an arbitrary route in said space.

* * * * *